United States Patent
Tsai et al.

(10) Patent No.: US 11,531,205 B2
(45) Date of Patent: Dec. 20, 2022

(54) HEAD MOUNTED DISPLAY DEVICE

(71) Applicant: HTC Corporation, Taoyuan (TW)

(72) Inventors: Cheng-Hsiu Tsai, Taoyuan (TW);
Wei-Jen Chang, Taoyuan (TW);
Fu-Cheng Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/715,044

(22) Filed: Apr. 7, 2022

(65) Prior Publication Data

US 2022/0229302 A1 Jul. 21, 2022

Related U.S. Application Data

(62) Division of application No. 16/952,091, filed on Nov. 19, 2020, now Pat. No. 11,360,311.

(60) Provisional application No. 62/957,281, filed on Jan. 5, 2020.

(51) Int. Cl.
| | |
|---|---|
| *G02F 1/1335* | (2006.01) |
| *G02B 27/01* | (2006.01) |
| *G02B 27/28* | (2006.01) |
| *G02F 1/01* | (2006.01) |
| *G02F 1/137* | (2006.01) |

(52) U.S. Cl.
CPC ..... *G02B 27/0172* (2013.01); *G02B 27/0179* (2013.01); *G02B 27/286* (2013.01); *G02F 1/0136* (2013.01); *G02F 1/137* (2013.01); *G02B 2027/0138* (2013.01); *G02B 2027/0187* (2013.01); *G02F 1/133524* (2013.01)

(58) Field of Classification Search
CPC ............... G02F 1/0136; G02F 1/1335; G02F 1/133504; G02F 1/133524; G02F 1/133526; G02F 1/137; G02B 27/0172; G02B 27/0179; G02B 27/286; G02B 27/0081; G02B 2027/0138; G02B 2027/0187; G02B 2027/0125; G02B 2027/0178
See application file for complete search history.

(56) References Cited

U.S. PATENT DOCUMENTS

2019/0101757 A1* 4/2019 Martinez ............ G02B 27/0172

* cited by examiner

*Primary Examiner* — Thoi V Duong
(74) *Attorney, Agent, or Firm* — JCIPRNET (57) ABSTRACT

A head mounted display device includes a display, a light waveguide element, and a light shutter. The display periodically provides a display image. The light waveguide element receives the display image, generates a projection image according to the display image, projects the projection image from a second surface, and projects the projection image to a target zone from a first surface. The light shutter is adjacent to the second surface of the light waveguide element and is coupled to the light waveguide element. The light shutter is periodically disabled and enabled in an alternating manner.

6 Claims, 9 Drawing Sheets

HEAD MOUNTED DISPLAY DEVICE

CROSS-REFERENCE TO RELATED APPLICATION

This application is a divisional application of and claims the priority benefit of U.S. patent application Ser. No. 16/952,091, filed on Nov. 19, 2020. The prior U.S. application Ser. No. 16/952,091, claims the priority benefit of U.S. provisional application Ser. No. 62/957,281, filed on Jan. 5, 2020. The entirety of each of the above-mentioned patent applications is hereby incorporated by reference herein and made a part of this specification.

BACKGROUND

Technical Field

The disclosure relates to a head mounted display device, and in particular, relates to a head mounted display device providing privacy mode or social mode applications.

Description of Related Art

In the related art, the light waveguide element of a head mounted display device of augmented reality may emit light on both surfaces, so the display image is projected to the outside of the head mounted display device, and an outside viewer may thus be able to read the confidential information viewed by the wearer.

On the other hand, when a user uses a head mounted display device provided by the related art, the outside viewer cannot clearly see the user's facial expression. As such, it is difficult for the outside viewer to socially interact with the user.

In addition, through the driving manner provided by the related art, the light shutter adjusts settings of different levels of transmittance through voltage control, but the uniformity of the viewing angle thereof may vary under different voltage settings, leading to uneven display images as a result.

SUMMARY

The disclosure provides a plurality of head mounted display devices capable of providing a privacy mode or social mode display effect.

A head mounted display device provided by the disclosure includes a display, a light waveguide element, a first image capturer, and a light shutter. The display periodically provides a display image and a setting image in an alternating manner. The light waveguide element is coupled to the display and generates a projection image according to the display image and the setting image in a time-division manner. The first image capturer is configured to periodically capture a target zone image. The light shutter is disposed between the light waveguide element and the target zone, and the light shutter is periodically disabled and enabled in an alternating manner. When the display provides the setting image, the light shutter is enabled, and the first image capturer captures the target zone image. When the display provides the display image, the light shutter is disabled, and the first image capturer stops capturing the target zone image.

To sum up, through periodical disabling and enabling of the light shutter provided by the disclosure in an alternating manner and the time of generation of the display image by the display, the image of the user of the head mounted display device may not be seen by the outside object role, or the image of the user may be seen by the outside object role. As such, the head mounted display device may provide enhanced performance in use when being applied to the privacy mode or the social mode.

BRIEF DESCRIPTION OF THE DRAWINGS

FIG. 4A to FIG. 5B are schematic views illustrating head mounted display devices and optical paths thereof according to a plurality of embodiments of the disclosure.

DESCRIPTION OF THE EMBODIMENTS

Figure 1:
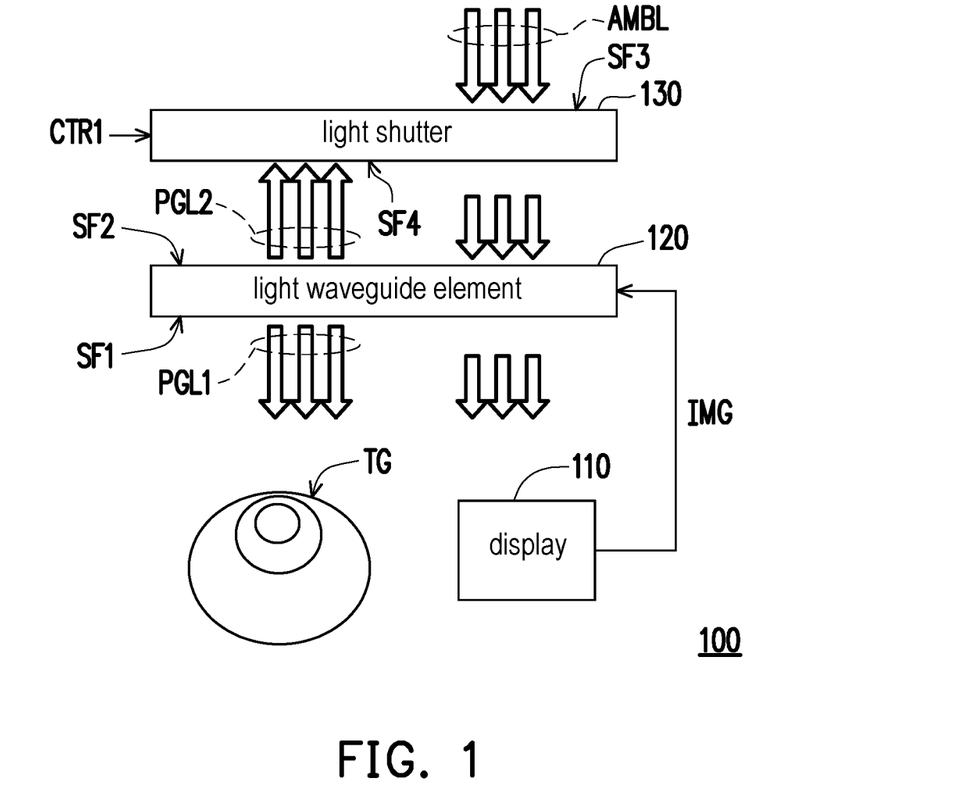
FIG. 1 is a schematic view illustrating a head mounted display device according to an embodiment of the disclosure.

With reference to FIG. 1, FIG. 1 is a schematic view illustrating a head mounted display device according to an embodiment of the disclosure. A head mounted display device 100 includes a display 110, a light waveguide element 120, and a light shutter 130. The display 110 is configured to generate a display image IMG according to a predetermined cycle. The light waveguide element 120 is coupled to the display 110. The light waveguide element 120 is configured to receive the display image IMG generated by the display 110 and generates identical projection images PGL1 and PGL2 according to the display image IMG. The light waveguide element 120 further projects the projection image PGL1 through a first surface SF1 thereof to a target zone TG and further projects the projection image PGL2 through a second surface SF2 to the light shutter 130. Herein, the first surface SF1 and the second surface SF2 are opposite to each other.

On the other hand, the light shutter 130 is adjacent to the second surface SF2 of the light waveguide element 120 and is coupled to the light waveguide element 120. Herein, the light shutter 130 may be periodically disabled and enabled in an alternating manner.

In this embodiment, a surface SF3 of the light shutter 130 facing the outside of the head mounted display device 100 may receive ambient light AMBL. A surface SF4 of the light shutter 130 facing the light waveguide element 130 may receive the projection image PGL2. In this embodiment, the light shutter 130 is an electrically-controlled light shutter and may be disabled or enabled according to an electrical control signal CTR1. When the light shutter 130 is enabled according to the control signal CTR1, the ambient light AMBL is shuttered and may not be transmitted to the light waveguide element 120. In contrast, when the light shutter 130 is disabled according to the control signal CTR1, the ambient light AMBL may pass through the light shutter 130 and is transmitted to the light waveguide element 120.

Note that when the display 110 generates the display image IMG, the light shutter 130 is synchronously enabled according to the control signal CTR1. In this way, the projection image PGL2 generated by the light waveguide element 120 corresponding to the display image IMG is shuttered by the light shutter 130 and may not be transmitted to the outside of the head mounted display device 100. At the same time, the projection image PGL1 generated by the light waveguide element 120 is effectively transmitted to the target zone TG (i.e., an eyeball position of a user). At this time, the user may observe the display image IMG generated by the display 110.

In contrast, when the display 110 stops generating the display image IMG, the light shutter 130 is synchronously disabled according to the control signal CTR1. At this time, the display 110 stops generating the display image IMG. The ambient light AMBL may pass through the disabled light shutter 130 to be transmitted to the light waveguide element 120 and is transmitted to the target zone TG. At this time, the user may observe an ambient image transmitted by the external ambient light AMBL.

According to the above, it may be seen that when the light shutter 130 is periodically enabled and disabled in an alternating manner, the display 110 may generate the display image IMG in an alternating manner, so that the user may observe a display effect of virtual reality and/or augmented reality. Moreover, the display image IMG and an image of the user (a target zone image) are not transmitted to the outside of the head mounted display device 100, so that a privacy mode effect may be achieved.

Figure 2:
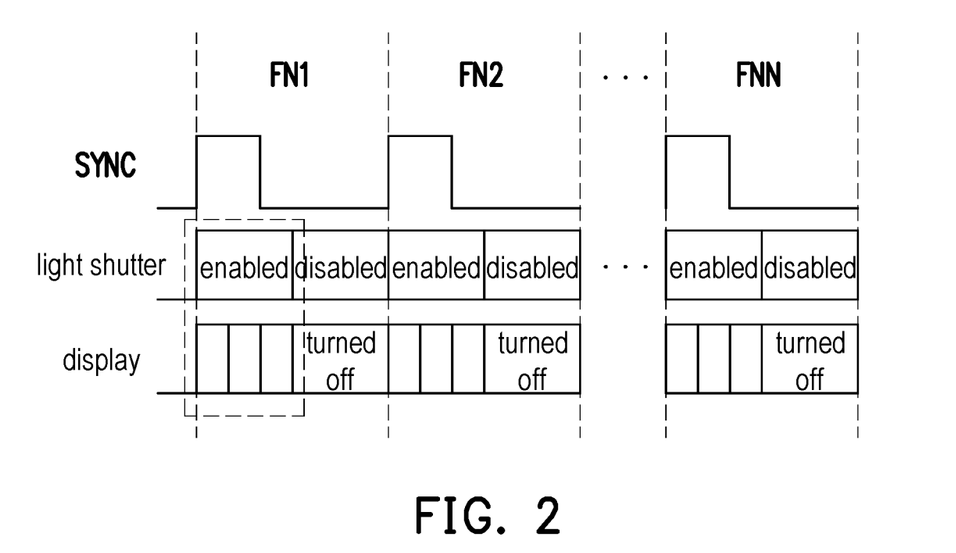
FIG. 2 is a sequence diagram illustrating operation of the head mounted display device of FIG. 1 of the disclosure.

With reference to FIG. 2, FIG. 2 is a sequence diagram illustrating operation of the head mounted display device of FIG. 1 of the disclosure. Herein, the head mounted display device 100 may divide an operation sequence into a plurality of frame time intervals FN1 to FNN according to a synchronous signal SYNC. Herein, in a single frame time interval (taking the frame time interval FN1 as an example), the synchronous signal SYNC is at a high level, light shutter 130 may be enabled, and the display 110 may generate the display image IMG according to a pulse driving manner. In contrast, in the frame time interval FN1, when the synchronous signal SYNC is at a low level, the light shutter 130 may be disabled, and the display 110 stops generating the display image IMG.

Incidentally, a duty cycle of the synchronous signal SYNC may be dynamically adjusted and is not particularly limited. For instance, when brightness of the display image IMG is required to be increased, a time length of a positive pulse of the synchronous signal SYNC may be increased. In contrast, when brightness of the ambient image is required to be increased, the time length of the positive pulse of the synchronous signal SYNC may be decreased.

Incidentally, the light shutter 130 provided by this embodiment is periodically operated between being completely turned on and completely turned off, so uniformity of a viewing angle of the user is effectively improved.

Figure 3:
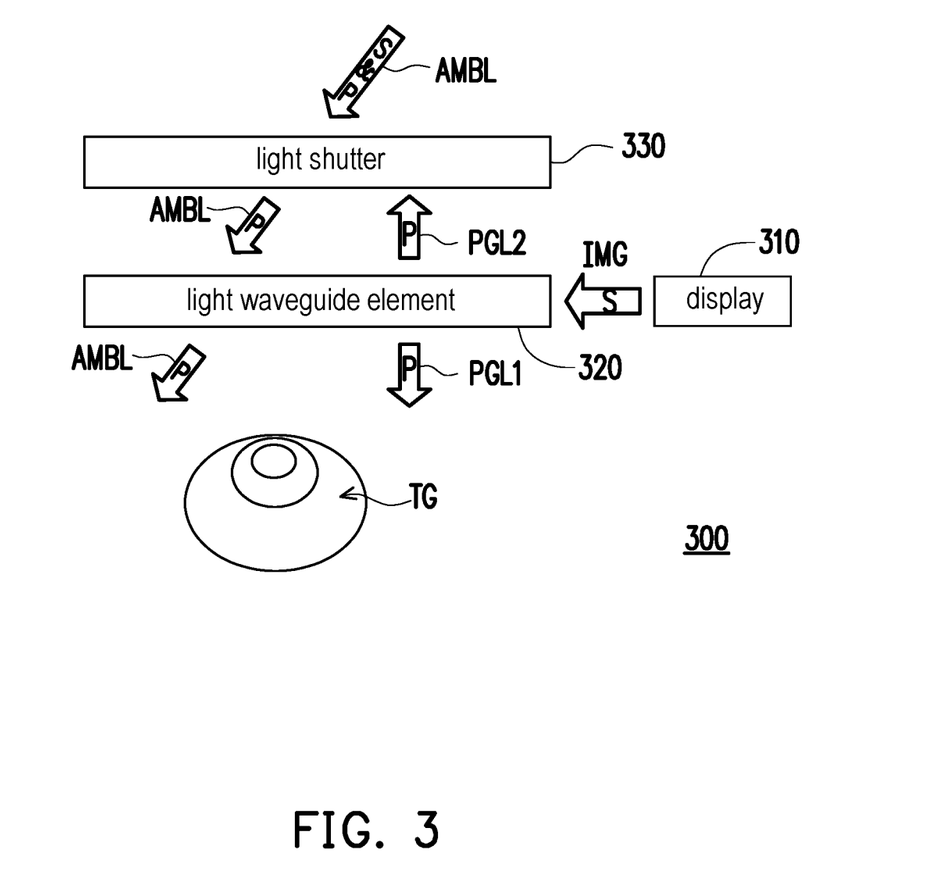
FIG. 3 is a schematic view illustrating a head mounted display device and an optical path thereof according to another embodiment of the disclosure.

With reference to FIG. 3, FIG. 3 is a schematic view illustrating a head mounted display device and an optical path thereof according to another embodiment of the disclosure. A head mounted display device 300 includes a display 310, a light waveguide element 320, and a light shutter 330. Herein, in this embodiment, the light waveguide element 320 may be a polarization-sensitive light waveguide element, and the light shutter 330 may be an electrically-controlled liquid crystal light shutter.

The display 310 in the head mounted display device 300 may provide the display image IMG of second direction linearly polarized light (e.g., S light). After the display image IMG of the S light is transmitted to the light waveguide element 320, the light waveguide element 120 may generate the projection images PGL1 and PGL2 of first direction polarized light (P light) according to the display image IMG of the S light. Herein, the projection image PGL1 is projected to the target zone TG, and the projection image PGL2 is projected to the light shutter 330. The light shutter 330 may shutter the projection image PGL2 of the P light and prevents the projection image PGL2 from being transmitted to the outside of the head mounted display device 300, and that the privacy mode effect is thus achieved.

On the other hand, the ambient light AMBL having a first direction polarized light (P light) component and a second direction polarized light (S light) component is projected to the light shutter 330. The light shutter 130 may shutter the S light component of the ambient light AMBL and keeps the P light component of the ambient light AMBL to be transmitted to the light waveguide element 320. The light waveguide element 320 may transmit the P light component of the ambient light AMBL to the target zone TG to generate the ambient image.

Figure 4A:
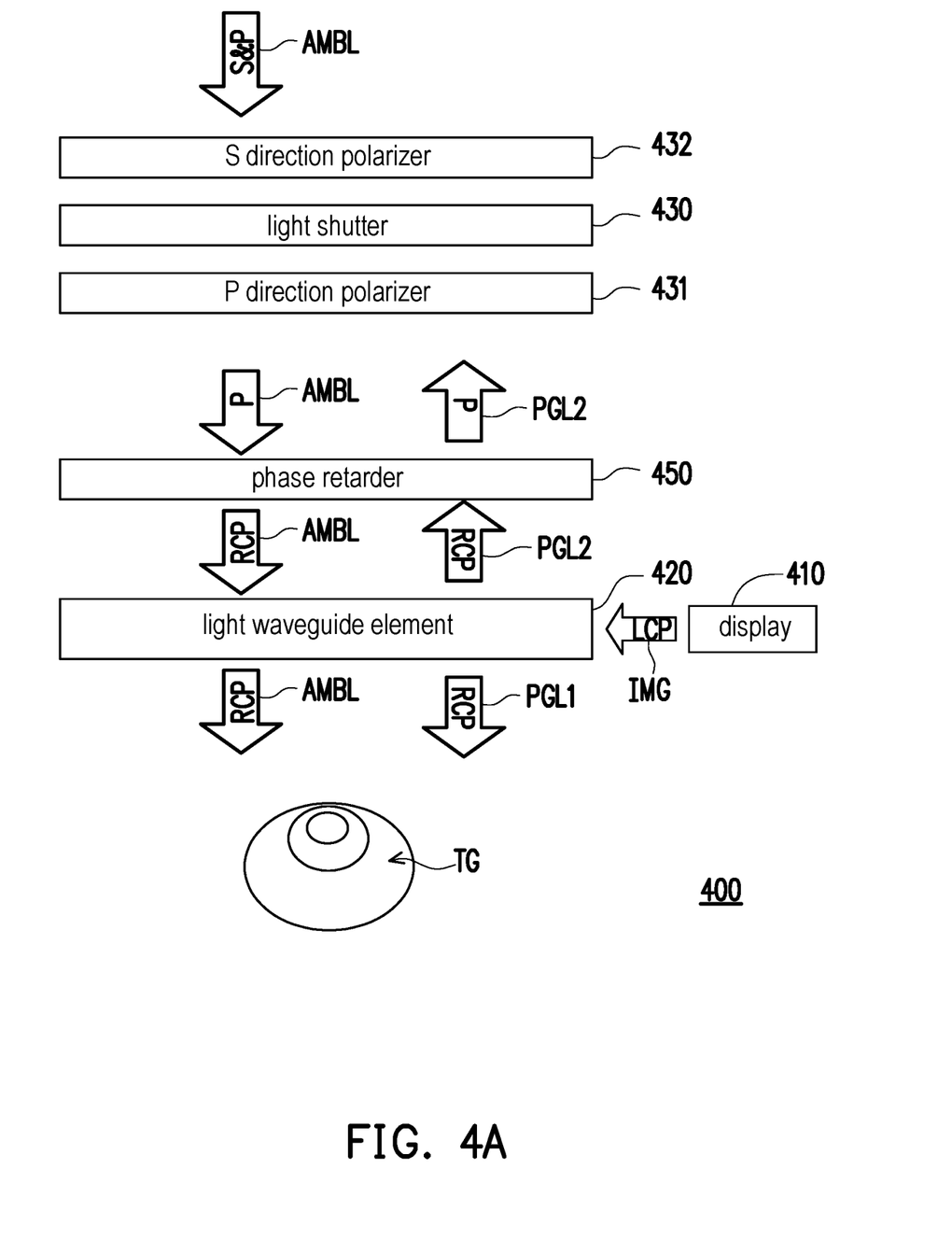

With reference to FIG. 4A, FIG. 4A is a schematic view illustrating a head mounted display device and an optical path thereof according to another embodiment of the disclosure. A head mounted display device 400 includes a display 410, a light waveguide element 420, a light shutter 430, a S direction (second direction) polarizer 432, a P direction (first direction) polarizer 431, and a phase retarder 450. Herein, the light waveguide element 420 may be a polarization-sensitive light waveguide element, and the light shutter 430 may be an electrically-controlled liquid crystal light shutter. In this embodiment, the S direction polarizer 432 and the P direction polarizer 431 are disposed on two sides of the light shutter 430. The P direction polarizer 431 is disposed between the light shutter 430 and the phase retarder 450. The phase retarder 450 is disposed between the P direction polarizer 431 and the light waveguide element 420. The light waveguide element 420 is disposed adjacent to the target zone TG.

In this embodiment, the display 410 provides the display image IMG of first rotation direction circularly polarized light LCP to the light waveguide element 420. The light waveguide element 420 generates the projection images PGL1 and PGL2 of second rotation direction circularly polarized light RCP according to the display image IMG of the first rotation direction circularly polarized light LCP. The projection image PGL1 is transmitted to the target zone TG, and the projection image PGL2 is transmitted to the phase retarder 450. In this embodiment, the phase retarder 450 is a ¼ wave plate (quarter wave plate, QWP) which may delay a received light wave by a ¼ wavelength. The phase retarder 450 may convert the projection image PGL2 of the second rotation direction circularly polarized light RCP to the projection image PGL2 of the P light.

As described above, the projection image PGL2 of the P light is projected to the P direction polarizer 431 and may be controlled whether to pass through by the light shutter 430. Therefore, as the light shutter 430 may control the projection image PGL2 not to be transmitted to the outside of the head mounted display device 400, the privacy mode effect is thus achieved.

On the other hand, the ambient light AMBL having the first direction polarized light (P light) component and the second direction polarized light (S light) component is projected to the S direction polarizer 432. Through the S direction polarizer 432 and the P direction polarizer 431, the second direction polarized light (S light) component of the ambient light AMBL may be filtered, and the first direction polarized light (P light) of the ambient light AMBL may be transmitted to the phase retarder 450.

The phase retarder 450 further converts the first direction polarized light (P light) of the ambient light AMBL to generate the ambient light AMBL of the second rotation direction circularly polarized light (RCP). The ambient light AMBL of the second rotation direction circularly polarized light (RCP) is projected to the light waveguide element 420, and the light waveguide element 420 may transmit the ambient light AMBL of the second rotation direction circularly polarized light (RCP) to the target zone TG.

Figure 4B:
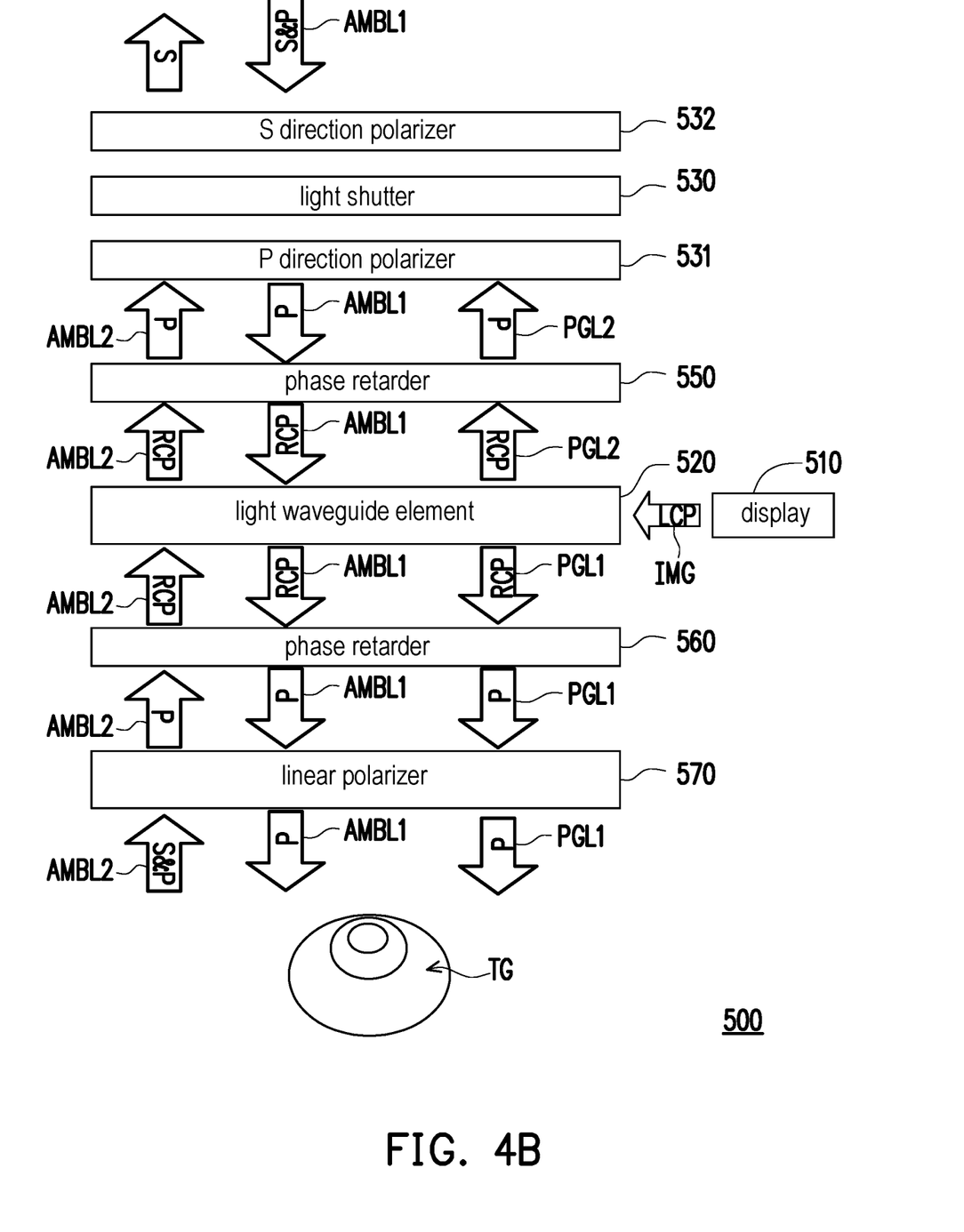

With reference to FIG. 4B, FIG. 4B is a schematic view illustrating a head mounted display device and an optical path thereof according to another embodiment of the disclosure. A head mounted display device 500 includes a display 510, a light waveguide element 520, a light shutter 530, a S direction (second direction) polarizer 532, a P direction (first direction) polarizer 531, phase retarders 550 and 560, and a linear polarizer 570. Herein, the light waveguide element 520 may be a polarization-sensitive light waveguide element, and the light shutter 530 may be an electrically-controlled liquid crystal light shutter.

In this embodiment, the S direction polarizer 532 and the P direction polarizer 531 are disposed on two opposite lateral sides of the light shutter 530. Herein the P direction polarizer 531 may face the target zone TG. The phase retarder 550, the light waveguide element 520, the phase retarder 560, and the linear polarizer 570 are disposed between the P direction polarizer 531 and the target zone TG in sequence. Herein, the display 510 provides the display image IMG of first rotation direction circularly polarized light (LCP) to the light waveguide element 520. The light waveguide element 520 generates the display image IMG of the second rotation direction circularly polarized light (RCP) according to the display image IMG of the first rotation direction circularly polarized light (LCP). The light waveguide element 520 transmits the display image IMG of the second rotation direction circularly polarized light (RCP) to the phase retarders 550 and 560.

In this embodiment, each of the phase retarders 550 and 560 is a QWP. The phase retarder 550 may convert the display image IMG of the second rotation direction circularly polarized light (RCP) to the display image IMG of the first direction polarized light (P light). The display image IMG of the first direction polarized light (P light) is further transmitted to the P direction polarizer 531. The light shutter 530 is then controlled to be turned on or turned off, the display image IMG may not be transmitted to the outside of the head mounted display device 500, and the privacy mode effect is thus achieved.

On the other hand, the phase retarder 560 may convert the display image IMG of the second rotation direction circularly polarized light (RCP) to the display image IMG of the first direction polarized light (P light) and transmits the display image IMG of the first direction polarized light (P light) to the linear polarizer 570. Through the linear polarizer 570, the display image IMG of the first direction polarized light (P light) may be transmitted to the target zone TG.

In the embodiments of the disclosure, the S direction polarizer 532 may receive ambient light AMBL1 having the first direction polarized light (P light) component and the second direction polarized light (S light) component. Through functioning of the S direction polarizer 532, the light shutter 530, and the P direction polarizer 531, the S light component in the ambient light AMBL1 may be filtered, and the P light component in the ambient light AMBL1 is transmitted to the phase retarder 550. The phase retarder 550 converts the P light component of the ambient light AMBL1 to the ambient light AMBL1 of the second rotation direction circularly polarized light (RCP). The light waveguide element 520 receives the ambient light AMBL1 of the second rotation direction circularly polarized light (RCP) and transmits the ambient light AMBL1 of the second rotation direction circularly polarized light (RCP) to the phase retarder 560.

The phase retarder 560 converts the ambient light AMBL1 of the second rotation direction circularly polarized light (RCP) to the ambient light AMBL1 of the P light. The ambient light AMBL1 of the P light is provided to the linear polarizer 570 and is transmitted to the target zone TG through the linear polarizer 570.

In addition, in this embodiment, the linear polarizer 570 may receive ambient light AMBL2 having the first direction polarized light (P light) component and the second direction polarized light (S light) component of another direction. The linear polarizer 570 may shutter the S light component of the ambient light AMBL2. The phase retarder 560 is configured to convert the P light component of the ambient light AMBL2 to the ambient light AMBL2 of the second rotation direction circularly polarized light (RCP). The light waveguide element 520 transmits the ambient light AMBL2 of the second rotation direction circularly polarized light (RCP) to the phase retarder 550. The phase retarder 550 converts the ambient light AMBL2 of the second rotation direction circularly polarized light (RCP) to the ambient light AMBL2 of the P light.

When the S direction polarizer 532 functions, the ambient light AMBL2 of the P light is converted to the ambient light AMBL2 of the S light and is transmitted to the outside of the head mounted display device 500.

Figure 5A:
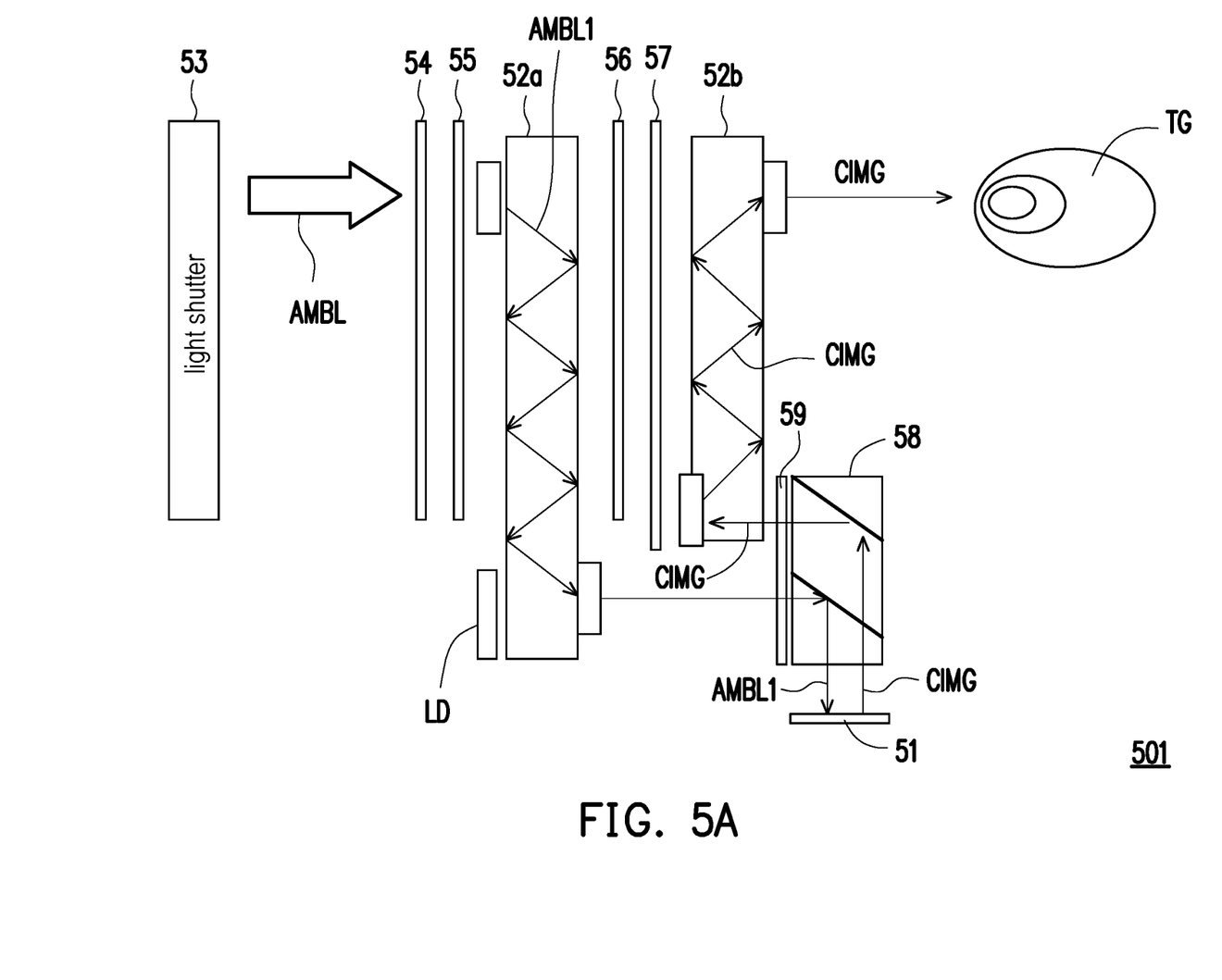
Figure 5B:
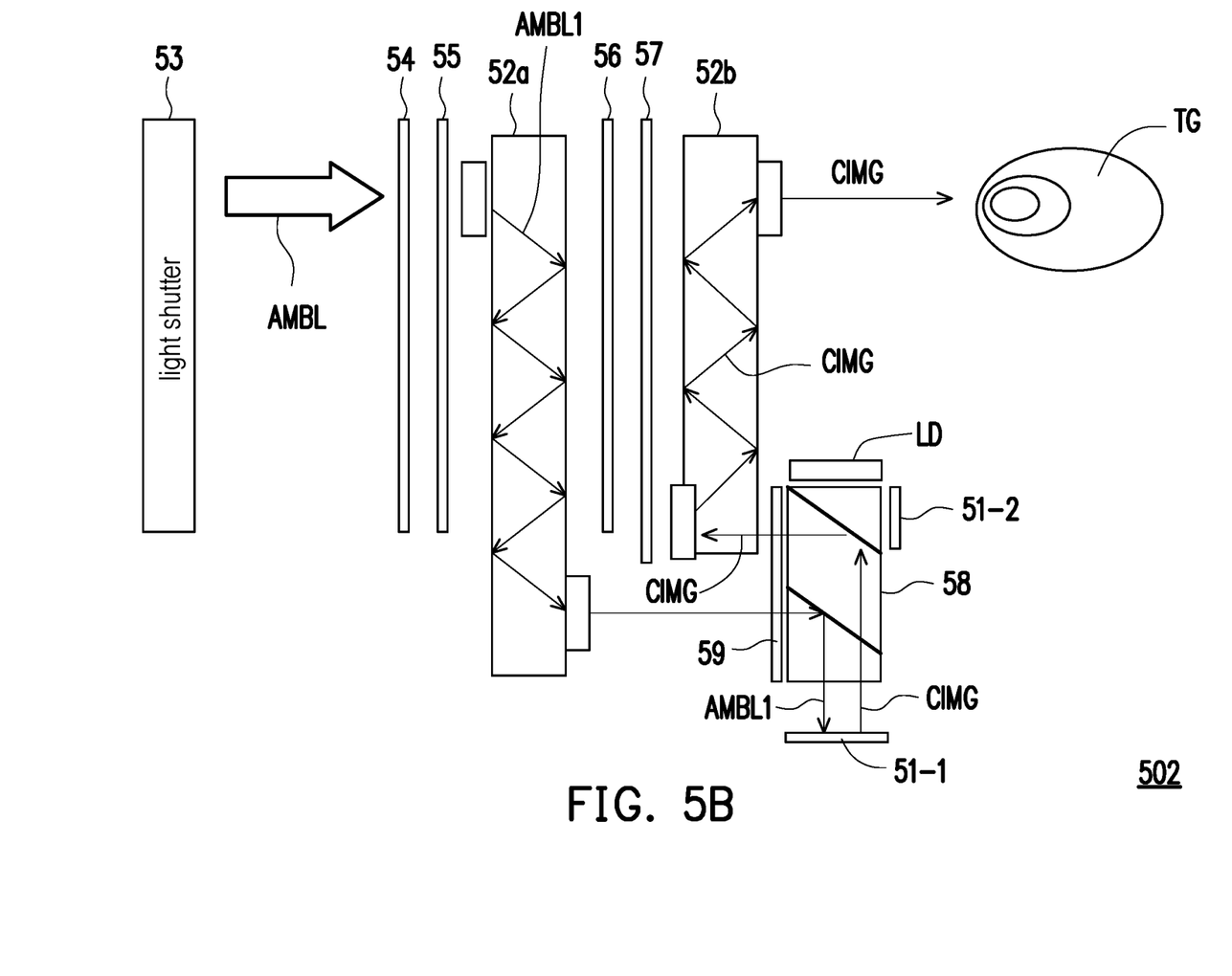

With reference to FIG. 5A and FIG. 5B, FIG. 5A and FIG. 5B are schematic views illustrating head mounted display devices and optical paths thereof according to another two embodiments of the disclosure. In FIG. 5A, a head mounted display device 501 includes a display 51, sub-light waveguide elements 52a and 52b, a light shutter 53, a S direction (second direction) polarizer 54, a P direction (first direction) polarizer 57, phase retarders 55, 56, and 59, and a light-splitting element 58. Herein, a light waveguide element provided by this embodiment is divided into the sub-light waveguide elements 52a and 52b. The sub-light waveguide elements 52a and 52b are arranged between the light shutter 53 and the target zone TG in sequence. The S direction polarizer 54 is disposed between the light shutter 53 and the sub-light waveguide element 52a. The phase retarder 56 and the P direction polarizer 57 are disposed between the sub-light waveguide elements 52a and 52b in sequence. The S direction polarizer 54 receives the ambient light AMBL having the P light and S light components and generates the ambient light AMBL1 of the second rotation direction circularly polarized light (RCP) together with the phase retarder (QWP).

The ambient light AMBL1 is transmitted into the sub-light waveguide element 52a. The sub-light waveguide element 52a transmits the ambient light AMBL1, converts the ambient light AMBL1 to the first rotation direction circularly polarized light (LCP), and transmits the ambient light AMBL1 of the first rotation direction circularly polarized light (LCP) to the phase retarder 59. The phase retarder 59 converts the ambient light AMBL1 to the S light and transmits the ambient light AMBL1 of the S light into the light-splitting element 58. Herein, surfaces of the phase retarder 59 and the light-splitting element 58 receiving the ambient light AMBL1 are disposed adjacent to each other. The light-splitting element 58 transmits the ambient light AMBL1 of the S light to the display 51. In this embodiment, the display 51 may be a liquid crystal on silicon display.

Besides, the display 51 may send a display image CIMG of the P light to the light-splitting element 58. The light-splitting element 58 transfers the display image CIMG of the P light to the phase retarder 59, and the phase retarder 59 converts the display image CIMG of the P light to the display image CIMG of the second rotation direction circularly polarized light (RCP) and transmits the display image CIMG of the second rotation direction circularly polarized light (RCP) to the sub-light waveguide element 52b. Through a light waveguide effect provided by the sub-light waveguide element 52b, the display image CIMG may be transmitted to the target zone TG. Herein, the display image CIMG transmitted in the sub-light waveguide element 52b may be the first rotation direction circularly polarized light (LCP), and the display image CIMG sent to the target zone TG may be the second rotation direction circularly polarized light (RCP).

Note that in this embodiment, the display image CIMG may include an ambient light image formed by the ambient light AMBL1 and may provide the user with a display effect of observing the augmented reality. Besides, in this embodiment, an image of the target zone TG is not seen by a user outside the head mounted display device 5A, and that the privacy mode effect is thus achieved.

Besides, in FIG. 5B, different from FIG. 5A, a head mounted display device 502 in FIG. 5B has two separately disposed displays 51-1 and 51-2. An arrangement position of the display 51-1 may be identical to that of the display 51 in FIG. 5A. The display 51-2 may be disposed adjacent to another surface of the light-splitting element 58. Herein, a display image sent by the display 51-2 may directly penetrate through the light-splitting element 58 and then passes through the phase retarder 59 to be transmitted into the sub-light waveguide element 52b.

Incidentally, in each of the embodiments of FIGS. 5A and 5B, a light-emitting diode LD may be configured to project a light beam to the eyeball of the user when tracking movements of the eyeball.

Figure 6:
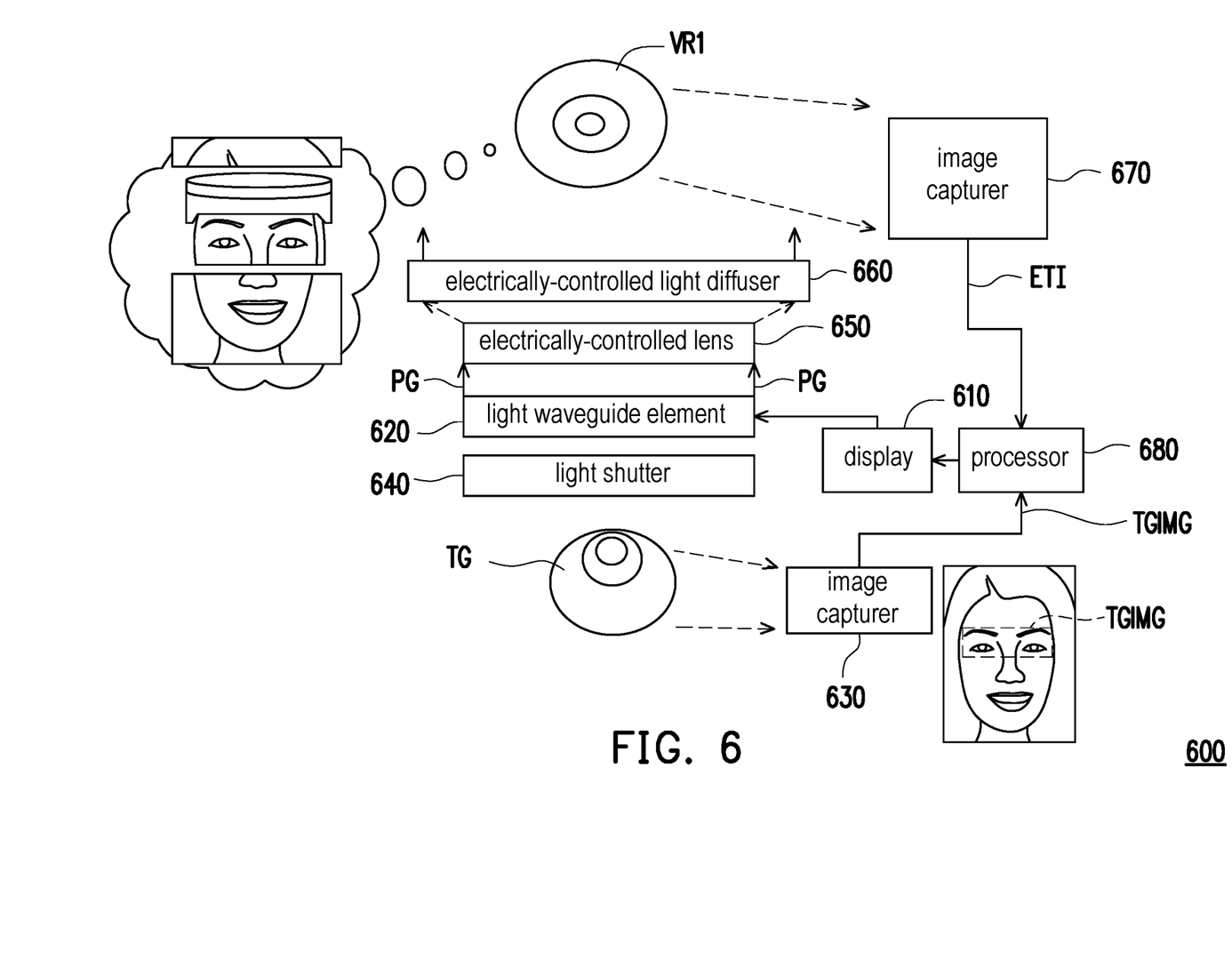
FIG. 6 is a schematic view illustrating a head mounted display device 600 according to another embodiment of the disclosure.

With reference to FIG. 6, FIG. 6 is a schematic view illustrating a head mounted display device 600 according to another embodiment of the disclosure. The head mounted display device 600 includes a display 610, a light waveguide element 620, image capturers 630 and 670, a light shutter 640, an electrically-controlled lens 650, an electrically-controlled light diffuser 660, and a processor 680. The display 610 may periodically provide the display image IMG and a setting image SETI in an alternating manner. The light waveguide element 620 is coupled to the display 610. The light waveguide element 620 generates a projection image PG according to the display image IMG and the setting image SETI in a time-division manner. Herein, the projection image PG1 is projected to the electrically-controlled lens 650.

In addition, the light shutter 640 is disposed between the light waveguide element 620 and the target zone TG, and the light shutter 640 is periodically disabled and enabled in an alternating manner. When the light shutter 640 is enabled, light may not pass through the light shutter 640, and when the light shutter 640 is disabled, light may pass through the light shutter 640.

The image capturer 630 may be configured to periodically capture a target zone image TGIMG of the target zone TG. When the target zone TG corresponds to an eye position of the user, the target zone image TGIMG may be an image of the eye of the user. The image capturer 630 is coupled to the processor 680 and sends the target zone image TGIMG to the processor 680. Herein, the target zone image TGIMG may act as the setting image SETI. In the embodiments of the disclosure, the setting image SETI may also be other predetermined images.

Regarding details of operation, when the display 610 provides the setting image SETI, the light shutter 640 is enabled. At the same time, the image capturer 630 captures the target zone image TGIMG. When the display 610 provides the display image IMG, the light shutter 640 is disabled, and the image capturer 630 stops capturing the target zone image TGIMG.

On the other hand, in the embodiments of the disclosure, the image capturer 670 may be configured to capture an eyeball image VR1 of the object role to act as eyeball tracking information ETI of the object role. The processor 680 obtains a viewing direction of the object role according to the eyeball tracking information ETI, such that the display 610 provides the setting image SETI according to the viewing direction.

On the other hand, the electrically-controlled lens 650 and the electrically-controlled light diffuser 660 may adjust a size of the projection image PG provided by the light waveguide element 620 and transmits the projection image PG to the object role, and a social mode effect may thus be achieved.

The processor 680 in this embodiment may be implemented through any processor having computing capabilities and known to a person of ordinary skill in the art and is not particularly limited.

Figure 7:
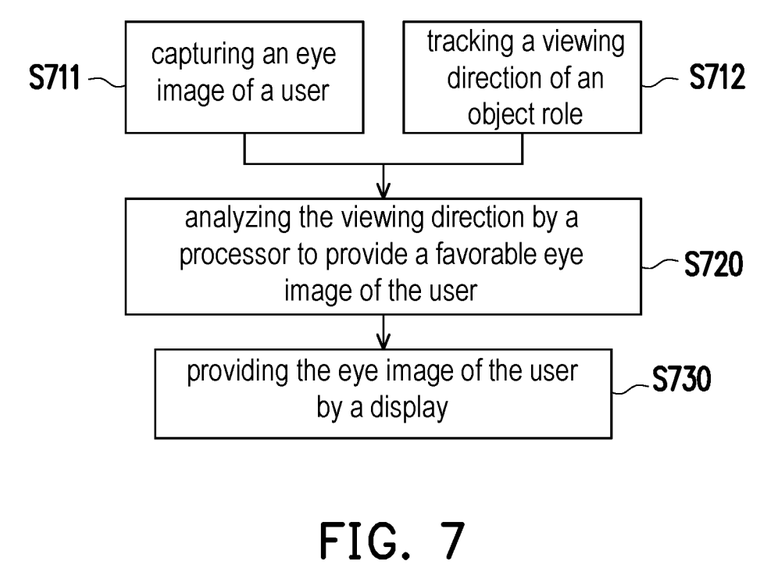
FIG. 7 is a schematic operation flow chart illustrating the head mounted display device of FIG. 6 provided by the embodiments of the disclosure.

With reference to FIG. 6 and FIG. 7 together, FIG. 7 is a schematic operation flow chart illustrating the head mounted display device of FIG. 6 provided by the embodiments of the disclosure. Herein, in step S711, the image capturer 630 may capture an eye image of the user. In step S712, through operation of the image capturer 670, the viewing direction of the object role may be tracked. Further, in step S720, the processor 680 may analyze the viewing direction of the object role and accordingly provides a favorable eye image of the user. In step S730, the display 610 may provide and output the eye image of the user to the object role for viewing, and the social mode effect is thus achieved.

Figure 8A:
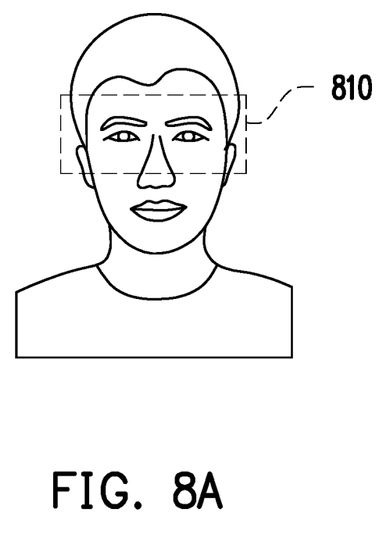
FIG. 8A and FIG. 8B are schematic views illustrating eye images of the user according to the embodiments of the disclosure.
Figure 8B:
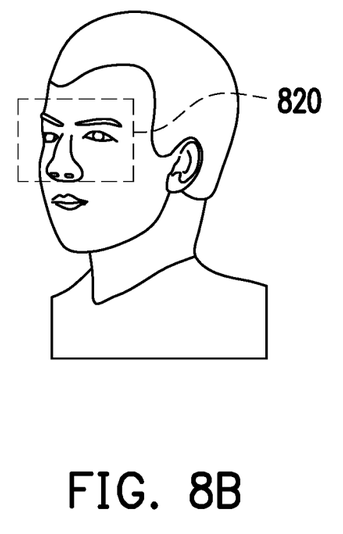

Herein, with reference to FIG. 8A and FIG. 8B which are schematic views illustrating eye images of the user according to the embodiments of the disclosure. When the viewing direction of the object role is determined to be directly looking at the user, an eye image 810 of the front of the user as shown in FIG. 8A may be generated. In addition, when the viewing direction of the object role is determined to be obliquely (side viewing) looking at the user, an eye image 820 of the front of the user as shown in FIG. 8B may be generated.

Figure 9:
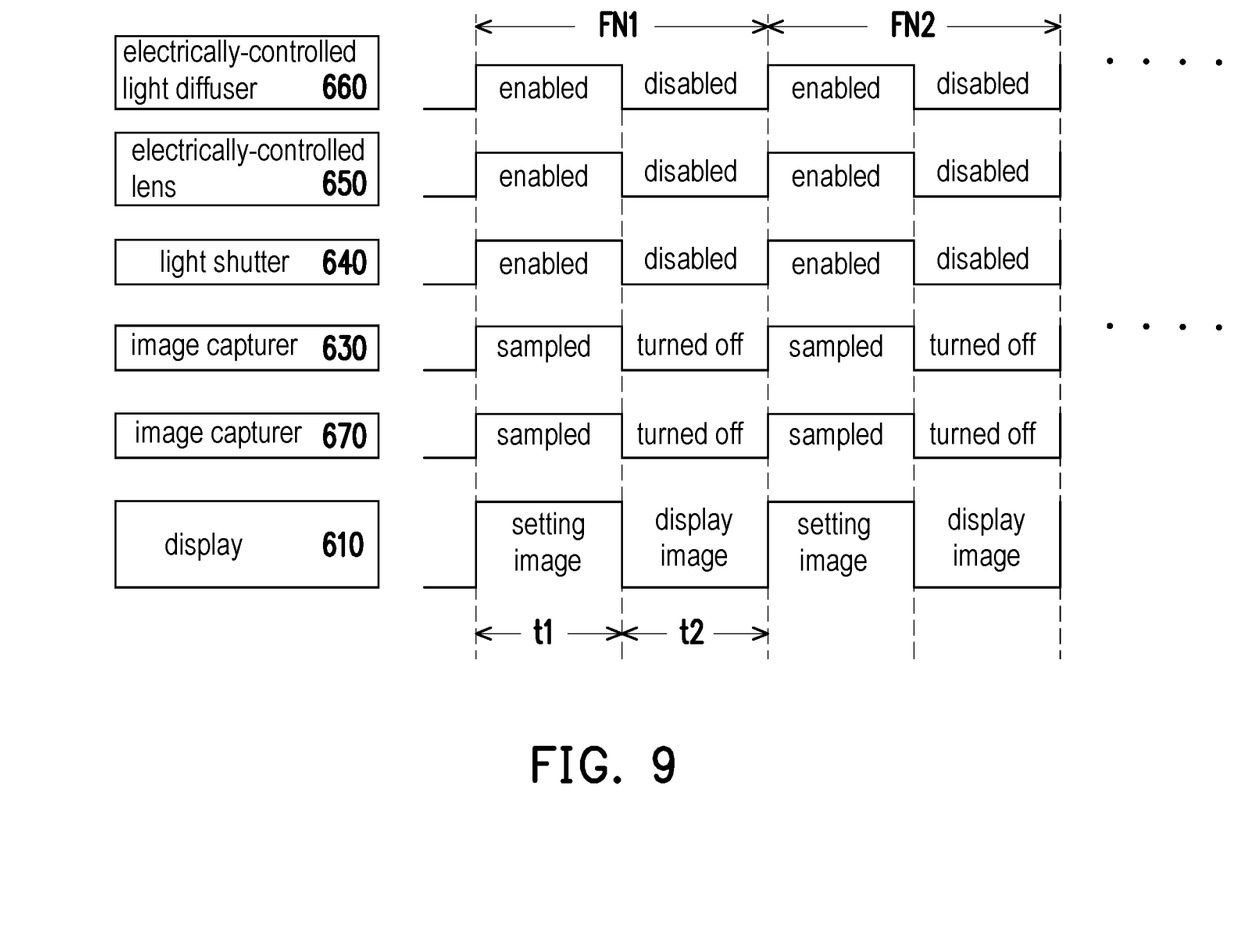
FIG. 9 is a sequence diagram illustrating operation of the head mounted display device of FIG. 6 of the disclosure.

With reference to FIG. 9, FIG. 9 is a sequence diagram illustrating operation of the head mounted display device of FIG. 6 of the disclosure. Herein, an operation sequence of the head mounted display device 600 may be divided into a plurality of continuous frame cycles FN1 and FN2. In the frame cycle FN1, the display 610 may provide the setting image SET1 first in a time interval t1 and then provides the display image IMG in a time interval t2. Correspondingly, in the time interval t1, the image capturer 630 captures the eye image of the user, and the image capturer 670 synchronously captures the eyeball image VR1 of the object role. At the same time, the electrically-controlled lens 650, the electrically-controlled light diffuser 660, and the light shutter 640 are all enabled. In this way, the eye image of the user captured by the image capturer 630 may act as the setting image SET1 and is transmitted to the object role end through the projection image PG. The object role may thus observe the eye image of the user.

In the time interval t2, the electrically-controlled lens 650, the electrically-controlled light diffuser 660, and the light shutter 640 are all disabled, and the image capturers 630 and 670 are both turned off. At the same time, the display 610 provides the display image IMG. At this time, the light shutter 640 is disabled, and the display image IMG transmitted by the light waveguide element 620 may penetrate through the light shutter 640 to be transmitted to the eye of the user. At the same time, the ambient light may penetrate through the light shutter 640 to be transmitted to the eye of the user, so that the user may observe the display effect of virtual reality and/or augmented reality.

In each of the frame cycles FN1 to FN2, the setting image SET1 is provided to the object role in an alternating manner and the display image IMG is provided to the user, and in this way, the user may socially interact with the object role synchronously when experiencing the display effect of virtual reality and/or augmented reality, and the social mode effect is thus achieved.

Incidentally, the light shutter 640 provided by this embodiment is periodically operated between being completely turned on and completely turned off, so uniformity of the viewing angle of the user is effectively improved.

In view of the foregoing, in the head mounted display device provided by the disclosure, as the display and the light shutter may be operated together to be disabled/enabled, the privacy mode or the social mode effect may thus be achieved. In addition, the light shutter provided by the disclosure is periodically operated between being completely turned on and completely turned off, so uniformity of the viewing angle of the user may be effectively improved.

What is claimed is:

1. A head mounted display device, comprising:
   a display, periodically providing a display image and a setting image in an alternating manner;
   a light waveguide element, coupled to the display, generating a projection image according to the display image and the setting image in a time-division manner,
   a first image capturer, configured to periodically capture a target zone image of a target zone; and
   a light shutter, disposed between the light waveguide element and the target zone, wherein the light shutter is periodically disabled and enabled in an alternating manner,
   wherein the light shutter is enabled and the first image capturer captures the target zone image when the display provides the setting image, and the light shutter is disabled and the first image capturer stops capturing the target zone image when the display provides the display image.

2. The head mounted display device according to claim 1, further comprising:
   an electrically-controlled lens, coupled to the second surface of the light waveguide element; and
   an electrically-controlled light diffuser, wherein the electrically-controlled lens is disposed between the electrically-controlled light diffuser and the light waveguide element.

3. The head mounted display device according to claim 2, wherein the electrically-controlled lens and the electrically-controlled light diffuser are enabled when the display provides the setting image, and the electrically-controlled lens and the electrically-controlled light diffuser are disabled when the display provides the display image.

4. The head mounted display device according to claim 1, wherein the setting image is the target zone image.

5. The head mounted display device according to claim 1, further comprising:
   a second image capturer, capturing an eyeball image of an object role to act as eyeball tracking information of the object role; and
   a processor, coupled to the second image capturer, the first image capturer, and the display, wherein the processor obtains a viewing direction of the object role according to the eyeball tracking information, such that the display provides the setting image according to the viewing direction.

6. The head mounted display device according to claim 5, wherein the second image capturer captures the eyeball image of the object role when the first image capturer captures the target zone image.

* * * * *